US009488778B2

(12) United States Patent
Osellame et al.

(10) Patent No.: US 9,488,778 B2
(45) Date of Patent: Nov. 8, 2016

(54) METHOD FOR REALIZING AN OPTICAL WAVEGUIDE IN A SUBSTRATE BY MEANS OF A FEMTOSECOND LASER

(71) Applicants: CONSIGLIO NAZIONALE DELLE RIDERCHE, Rome (IT); SAPIENZA UNIVERSITA' DI ROMA, Rome (IT)

(72) Inventors: Roberto Osellame, Milan (IT); Andrea Crespi, Busto Arsizio (IT); Giacomo Corrielli, Sesto San Giovanni (IT); Fabio Sciarrino, Naples (IT)

(73) Assignees: CONSIGLIO NAZIONALE DELLE RICERCHE, Rome (IT); SAPIENZA UNIVERSITA' DI ROMA, Rome (IT)

(*) Notice: Subject to any disclaimer, the term of this patent is extended or adjusted under 35 U.S.C. 154(b) by 0 days.

(21) Appl. No.: 14/784,900

(22) PCT Filed: Apr. 18, 2014

(86) PCT No.: PCT/IB2014/060825
§ 371 (c)(1),
(2) Date: Oct. 15, 2015

(87) PCT Pub. No.: WO2014/170872
PCT Pub. Date: Oct. 23, 2014

(65) Prior Publication Data
US 2016/0054522 A1 Feb. 25, 2016

(30) Foreign Application Priority Data

Apr. 18, 2013 (IT) .................................. MI13A0631

(51) Int. Cl.
*B23K 26/00* (2014.01)
*G02B 6/13* (2006.01)
(Continued)

(52) U.S. Cl.
CPC .............. *G02B 6/13* (2013.01); *B23K 26/0057* (2013.01); *G02B 6/105* (2013.01); *G02B 6/126* (2013.01); *G02B 6/125* (2013.01); *G02B 2006/12171* (2013.01)

(58) Field of Classification Search
CPC .......... G02B 6/13; G02B 6/123; G02B 6/10; B23K 26/00
USPC ............................... 65/392; 385/123, 48, 126
See application file for complete search history.

(56) References Cited

U.S. PATENT DOCUMENTS 7,095,931 B2 * 8/2006 Sezerman ........... C03C 23/0025
385/123
7,294,454 B1 11/2007 Said et al.
(Continued)

FOREIGN PATENT DOCUMENTS

WO 0144871 A1 6/2001

OTHER PUBLICATIONS

Della Valle, G. et al., "Micronnachining of photonic devices by femtosecond laser pulses", Journal of Optics A: Pure and Applied Optics, vol. 11, 013001, 18 pages (2009).
(Continued)

*Primary Examiner* — Mark Halpern
(74) *Attorney, Agent, or Firm* — Volpe and Koenig, P.C.

(57) ABSTRACT

A method for realizing an optical waveguide in a substrate by means of a femtosecond laser system, the waveguide including a birefringence axis tilted by a predetermined angle for at least a segment, is disclosed. The method includes preparing a substrate including a free surface, focusing a femtosecond laser beam into the substrate, in order to induce a refractive index modification of a volume of such substrate around the focal region. The method further includes varying a propagation direction of the femtosecond laser beam to reach a propagation direction describing a predetermined non-vanishing angle with respect to the normal to the free surface of the substrate, and translating the focal region with respect to the substrate, in order to generate the waveguide segment.

16 Claims, 4 Drawing Sheets

(51) Int. Cl.
*G02B 6/10* (2006.01)
*G02B 6/126* (2006.01)
*G02B 6/125* (2006.01)
*G02B 6/12* (2006.01)

(56) References Cited

U.S. PATENT DOCUMENTS

| | | | | |
|---|---|---|---|---|
| 7,295,731 | B2* | 11/2007 | Sezerman | C03C 23/0025 385/123 |
| 2004/0028331 | A1 | 2/2004 | Ishii et al. | |
| 2004/0094527 | A1 | 5/2004 | Bourne et al. | |
| 2005/0271349 | A1 | 12/2005 | Obara et al. | |

OTHER PUBLICATIONS

Eaton, Shane M. et al., "Transition from thermal diffusion to heat accumulation in high repetition rate femtosecond laser writing of buried optical waveguides", Optics Express, vol. 16, No. 13, 9443-9458 (Jun. 11, 2008).

Fernandes, Luis A. et al., "Stress induced birefringence tuning in femtosecond laser fabricated waveguides in fused silica", Optics Express, vol. 20, No. 22, 24103-24114 (Oct. 8, 2012).

Fernandes, Luis A. et al., "Femtosecond laser writing of waveguide retarders in fused silica for polarization control in optical circuits", Optics Express, vol. 19, No. 19, 18294-18301 (Sep. 2, 2011).

Heidrich, H. et al. "Passive Mode Converter with a Periodically Tilted InP/GaInAsP Rib Waveguide", IEEE Photonics Technology Letters, vol. 4, No. 1, 34-36 (Jan. 1992).

Huang, J. Z. et al., "Realization of a Compact and Single-Mode Optical Passive Polarization Converter", IEEE Photonics Technology Letters, vol. 12, No. 3, 317-319 (Mar. 2000).

Mertens, K. et al., "First Realized Polarization Converter Based on Hybrid Supermodes", IEEE Photonics Technology Letters, vol. 10, No. 3, 388-390 (Mar. 1998).

Shani, Y. et al., "Polarization rotation in asymmetric periodic loaded rib waveguides", Appl. Phys. Lett. vol. 59, No. 11, 1278-1280 (Sep. 9, 1991).

* cited by examiner

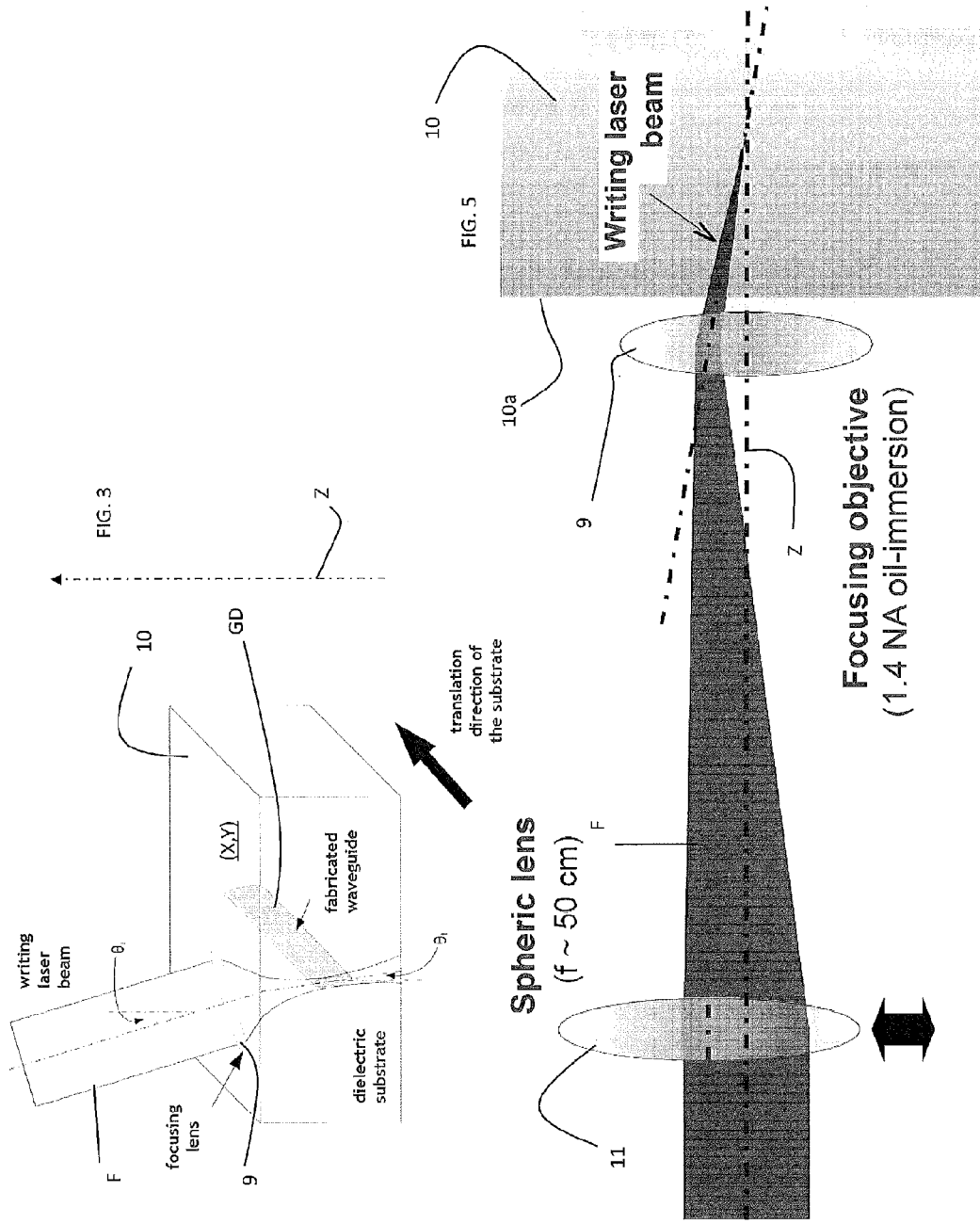

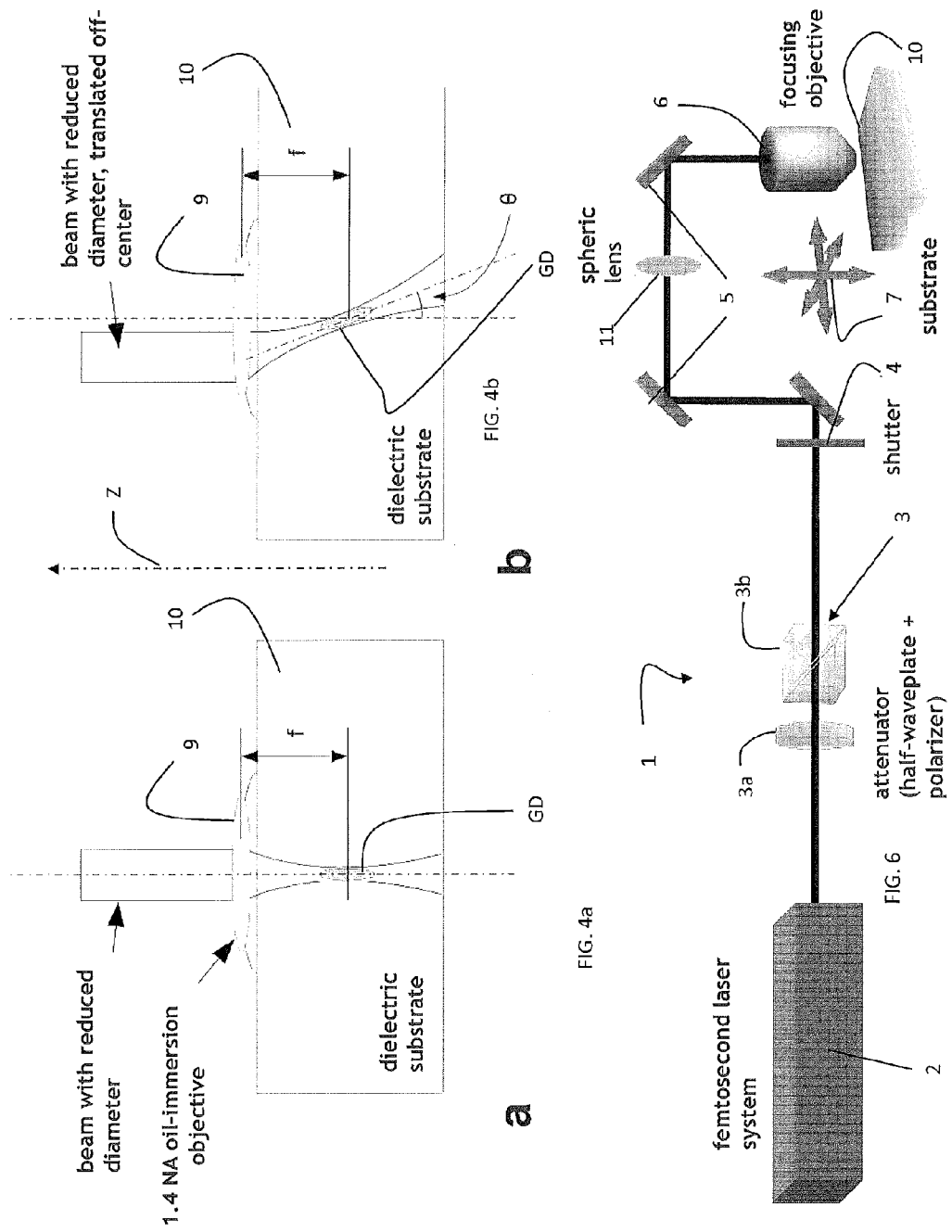

US 9,488,778 B2

METHOD FOR REALIZING AN OPTICAL WAVEGUIDE IN A SUBSTRATE BY MEANS OF A FEMTOSECOND LASER

CROSS REFERENCE TO RELATED APPLICATIONS

This application in a 371 National Phase filing of PCT/IB2014/060825 with an International Filing Date of Apr. 18, 2014, which claims the benefit of Italian Application No. MI2013A000631, which was filed on Apr. 18, 2013, and are incorporated herein by reference as if fully set forth.

FIELD OF INVENTION

This invention regards a method for realizing an optical waveguide within a substrate by means of a femtosecond laser; in particular, it consists in a method for realizing such optical waveguide with a varied birefringence axis. Namely, by means of the method of the present invention, the optical waveguide can have a birefringence axis oriented along a fixed non-vertical direction.

BACKGROUND

Femtosecond laser direct writing is a recently developed technique to fabricate optical waveguides. An overview of the technique can be conveniently found in G. Della Valle, R. Osellame & P. Laporta *Journal of Optics A: Pure and Applied Optics* 11, 013001 (2009). According to this technique, ultrafast laser pulses are focused in the bulk of a transparent substrate by means of a microscope objective, where non-linear absorption phenomena (multi-photon absorption, avalanche processes . . . ) induce a permanent modification of the material, localized in the focal region. In particular, by properly tuning the irradiation parameters, a localized refractive index increase can be obtained: by translating the substrate with respect to the laser beam, it is possible to literally draw the waveguides inside the material. Since no lithographic masks are employed, this technology enables quick and low-cost prototyping of novel photonic devices. In addition, since the waveguide is directly written in the volume of the substrate, this is the only technique which allows one to easily realize optical circuits with three-dimensional layouts.

A more detailed discussion of the interaction of a laser pulse with a duration of tens or hundreds of femtoseconds, focused by a lens or an objective inside a dielectric substrate, transparent at the wavelength of the laser beam (e.g. an Yb:based femtosecond laser system, with λ=1030 nm wavelength, and a borosilicate glass substrate) is provided below.

The photon energy $E_{ph}=hc/\lambda$, at this wavelength, falls into the transparency bandgap of the material ($E_{ph}<E_{gap}$), thus the commonly considered linear absorption phenomena are not efficient. The simultaneous absorption of n photons, to give $nE_{ph} \geq E_{gap}$, which has a generally lower probability, may however occur in this case. Then, the energy absorbed from a beam of intensity I becomes proportional to $I^n$, i.e. it is non-linear with the intensity. Such non-linear absorption phenomena are negligible at low intensity but become relevant at the high peak intensity of femtosecond pulses, especially if the intensity is further increased by focusing the beam with a lens or an objective.

In particular, in the case of a pulse duration of some hundreds of femtoseconds, the typical interaction process between the focused laser pulse and the transparent dielectric substrate is composed of a few steps:

I. in the first part of the pulse (with reference to the time evolution), a seed of free electrons is created by multi-photon absorption processes, triggered by the high intensity, II. such free-electron seed is multiplied by avalanche ionization processes; a cloud of plasma with increasing density is generated, III. at a certain point in this process the plasma density reaches a level for which the laser wavelength is absorbed linearly by the plasma; the remaining part of the laser pulse is then absorbed linearly by the plasma cloud, IV. once the laser pulse has ended, the highly energetic cloud of plasma transfers the energy to the substrate lattice in a relaxation process, producing a permanent modification.

An important consequence of the non-linearity of the interaction process of the focused beam is that the multi-photon absorption, the plasma generation and the subsequent permanent modification of the material occur only localized around the focal region, where the highest intensity is reached. It is thus made possible to induce in this way a localized modification in the bulk of a transparent material without affecting the external surface or other regions of the substrate.

Depending on the pulse energy, different modification types can be observed (with influence also from the specific substrate and from other irradiation parameters). Generally, for high energy levels material damage and microexplosions are reported. For lower energy levels and by properly tuning the irradiation parameters, a lighter (but still permanent) modification can be observed, namely a localized refractive index increase, in which the substrate maintains its transparency optical properties.

WO 2001/44871 by Corning Incorporated describes a method for realizing a guiding path, such as a waveguide, in a dielectric substrate. The substrate may consist, for instance, of borosilicate glass, sulfide glass or crystalline material. A pulsed laser beam is focused into the substrate, while the focus is translated with respect to it along a scanning path; the translation speed is tuned to obtain a refractive index increase of the material along the scanned path. No physical damage occurs to the material because of the laser irradiation. By means of this method several optical devices may be realized.

It is desirable to control the polarization of the light propagating inside an optical waveguide. It is notably difficult to realize waveguide-integrated polarization rotators. On the one side, lithographic waveguides generally yield enough birefringence to prevent cross-talk between different polarization modes; on the other side, a rotation of the waveguide birefringence axis requires to alter the waveguide symmetry, which is not trivial with planar technologies.

Different kinds of polarization rotators are reported, fabricated by lithographic techniques. In a first case, only a slight alteration of the waveguide symmetry is induced, either by depositing asymmetric structures above the waveguide (see e.g. Y. Shani et al., *Applied Physics Letters* 59, 1278-1280 (1991)), or by directly realizing a slightly asymmetric waveguide core cross-section (see e.g. H. Heidrich et al., *IEEE Photonics Technology Letters* 4, 34-36 (1992)). In this category of devices the two polarization modes are only slightly hybridized: to obtain a full polarization rotation several waveguide sections, alternately with a symmetric and asymmetric cross-section, need to be cascaded. In a third case, a single waveguide segment with pronounced cross-section asymmetry is sufficient to induce a full polarization rotation (J. Huang et al., *IEEE Photonics Technology Letters* 12, 317-319 (2000)). However, all these architectures, besides suffering from additional losses due to abrupt changes in the waveguide cross-section along the propagation (which become increasingly relevant when the number of cascaded segments increases), the fabrication of asymmetric waveguides or collateral deposition processes require additional lithographic steps, with all the problems related to the alignment precision between different steps. A further class of polarization rotators exploit a multi-mode waveguide segment (K. Mertens et al., *IEEE Photonics Technology Letters* 10, 388-390 (1998)), in which T.E. and T.M. modes are highly hybridized and power is transferred from one polarization to the other. Although the number of lithographic steps required in the latter case may be smaller than in the previously discussed architectures, it is in all cases true that the design of these devices needs the support of complex numerical simulations and that strict fabrication tolerances are required.

Hence, on the one hand, conventional lithographic techniques enable one to fabricate waveguide-integrated polarization rotators at the price of a remarkable increase in the complexity of the fabrication process. On the other hand, integrated birefringent waveplates which perform a polarization rotation have not been demonstrated yet, by means of direct writing fabrication techniques.

In the context of femtosecond laser micromachining, a fine control on the modal birefringence has been indeed demonstrated for waveguides fabricated in fused silica substrate, either by [[a]] varying the laser irradiation parameters (L. Fernandes et al., *Optics Express* 19, 18294-18301 (2011)) or by inscribing collateral structures in the substrate, which induce additional mechanical stress around the waveguide (L. Fernandes et al., *Optics Express* 20, 24103-24114 (2012)). However, the direction of the birefringence axis remains fixed and does not change the tilt angle. The possibility to modify this direction is indeed essential in order to effectively manipulate the polarization of the light propagating in waveguide circuits.

SUMMARY OF THE INVENTION

The manipulation of the polarization of the light in integrated optical circuits is essential in high bit-rate optical telecommunication systems, where polarization diversity, polarization multiplexing or coherent detection techniques are adopted.

Integrated optics have recently shown its potential also in quantum optics applications, in which the polarization degree of freedom of single photons is exploited to encode qubits. Taking advantage of the monolithic nature and intrinsic compactness of waveguide devices, interferometric circuits can be built, having a far superior degree of complexity and stability compared to that achievable with bulk optics. In particular, direct waveguide writing with a femtosecond laser has been conveniently adopted for these applications, enabling the realization of high quality, three-dimensional optical circuits, with low costs and high versatility.

Aiming at an effective manipulation of light polarization, several integrated components are needed: on the one side polarization insensitive directional couplers and directional couplers that splits two different polarizations, on the other side components that transfer power between two polarizations, such as polarization rotators, acting as integrated birefringent waveplates. The fabrication of polarization rotators by lithographic techniques is notably difficult, because an asymmetric modification of the waveguide cross-section is required to rotate its birefringence axis. On the other hand, integrated birefringent waveplates with tilted axis are yet to be demonstrated by femtosecond laser microfabrication.

Disclosed embodiments include a method for realizing optical waveguides with tilted birefringence axis by the femtosecond laser writing technology; such waveguides can be effectively employed as integrated birefringent waveplates. The simplicity of the proposed method makes it especially interesting, in particular in comparison to the complexity of the technological processes required to fabricate equivalent devices by lithography.

Namely, according to a preferred example, it is possible to fabricate a waveguide composed of segments with birefringence axis parallel to a first direction and segments with birefringence axis parallel to a second direction, with a non-zero angle between the two directions.

The Applicant considered at first a state-of-art system for femtosecond laser waveguide writing, such as the one reported in FIG. 1, where a laser beam is shown, focused by a lens inside a substrate. An arrow indicates the translation direction.

A laser beam can be approximated as a Gaussian beam propagating along a fixed direction. In the case of a focused beam, the focal region, which typically corresponds to the volume of the substrate that is modified by the laser interaction, has a substantially elliptical or elongated shape (see e.g. the cross section of a typical waveguide, shown in FIG. 1). In fact, the confocal parameter b of a Gaussian beam depends on the beam waist $w_0$ according to the formula $b=(2 n w_0)/NA$, where NA is the numerical aperture of the focusing lens or objective. Thus, one typically has $b>2 w_0$.

In one example, the substrate is translated below the focused laser beam, as shown by the arrow in FIG. 1 (in a further example the laser beam may be translated with respect to the substrate). In this way the laser beam "draws" into the substrate a path consisting in a volume of modified refractive index, within the volume of the dielectric substrate. If the translation speed is kept constant, the structure will be uniform along the translation direction. If the irradiation parameters are tuned to obtain a refractive index increase in the modified region, a structure is drawn inside the substrate by means of the apparatus in FIG. 1, analogous to the core of an optical fibre; namely, an optical waveguide is obtained.

It is worth noting that the waveguide can be drawn along a three-dimensional path: the refractive index modification of the substrate, induced by the pulsed laser beam, occurs only in a confined region around the focus; further, it is possible to vary the depth of the focal point inside the substrate, thus varying the depth of the fabricated waveguide.

If the substrate is translated along a substantially transverse direction with respect to the propagation direction of the writing beam (as shown in FIG. 1), the waveguide cross-section (on a plane orthogonal to the translation direction) will be elliptical, because of the reasons discussed previously. The size of the waveguide cross-section may be increased or decreased, within a preferential range of 2-20 μm, by modifying the irradiation parameters (pulse energy, translation speed, pulse repetition rate).

An optical waveguide, not necessarily fabricated by femtosecond laser pulses, may support in general two distinct guided modes having orthogonal polarizations. These polarization modes yield in general different propagation constants, namely two different effective refractive indices. This difference in refractive index is named modal birefringence. Two main causes of such birefringence may be identified:
  intrinsic birefringence and anisotropy of the material by which the waveguide is built,
  asymmetry in the shape of the waveguide, with respect to a 90° rotation around its axis.

A perfectly symmetric waveguide (e.g. a waveguide with perfectly square cross-section), composed of and surrounded by perfectly isotropic material, would yield no modal birefringence. However, this condition is difficult to achieve in practice. In fact, the fabrication techniques most often induce additional stress and anisotropy in the substrates; as well, a certain asymmetry in the waveguide cross-section may be due to fabrication tolerances.

Waveguides fabricated by femtosecond laser writing technology show typically an elliptical cross-section, as discussed above. In addition, the laser-matter interaction process may induce intrinsic birefringence in the modified material (this phenomenon has been observed in particular in fused silica substrate). Further, the waveguide creation process is often based on a local densification of the material, which generates mechanical stress and anisotropies in the modified region or around it. Because of all these reasons, a femtosecond laser written waveguide is typically birefringent.

The waveguide writing process presents some symmetry constraints. In particular, considering a straight waveguide as in FIG. 1, the waveguide possesses reflection symmetry with respect to the plane defined by the translation direction of the substrate and the writing beam propagation direction inside the substrate (being the writing beam itself symmetric with respect to such plane). Two different segments of a waveguide may have different symmetry planes. This symmetry constraint implies that, regardless of the microscopic causes of birefringence and of the birefringence value, the birefringence axis lies on such plane, or is perpendicular to it.

As a consequence, the two orthogonally polarized modes of a waveguide realized by femtosecond lasers are characterized by having, respectively, one the polarization parallel to the symmetry plane described above, the other the polarization orthogonal to it. In other words, polarized light propagating in a waveguide realized as in FIG. 1, sees a certain effective refractive index if its polarization is parallel to such plane, while it sees another (different) effective refractive index if its polarization is orthogonal to such plane. Depending on the details of the fabrication process and on the characteristics of the substrate, the birefringence value may be greater or smaller, namely the difference between the two effective refractive indices may be greater or smaller; however, this does not affect the orientation of the birefringence axis.

In order to obtain a birefringence axis having a certain tilt angle, the Applicant made the following observations. Let's consider, differently from FIG. 1, a laser beam propagating inside a substrate along a non-orthogonal direction with respect to the free surface (the latter defining the (X,Y) plane), and describing an angle $\theta_t$ with respect to the normal to the surface itself. In the following, the angle $\theta_t$ will be used to identify the propagation direction of the beam inside the substrate. As clearly shown in FIG. 2, the waveguide has ideally the same shape as in the case of orthogonal incidence (i.e. when the propagation direction of the writing beam is orthogonal to the substrate surface), but its cross-section is rotated by an angle $\theta_t$ with respect to the normal to the substrate free surface.

The symmetry constraints discussed with reference to FIG. 1 are still valid: the waveguide has reflection symmetry with respect to the plane defined by the writing beam direction (namely, its direction inside the substrate) and the translation direction of the substrate (or of the beam), as shown in FIG. 2. The birefringence axis of the fabricated waveguide is again parallel or orthogonal to such plane: hence, the birefringence axis of the waveguide is tilted by an angle $\theta_t$ with respect to the normal to the substrate surface or anyhow by an angle function of $\theta_t$.

Therefore, the Applicant has observed that tilting the propagation direction of the writing beam inside the substrate of an angle $\theta_t$ implies that also the birefringence axis of the fabricated waveguide is tilted by the same angle $\theta_t$, within ±1° experimental uncertainty. Henceforth, when it is said that the birefringence axis direction substantially coincides with the direction of the writing beam, it is intended that this holds within such experimental uncertainty.

In accordance with a first aspect, disclosed embodiments include a method for realizing a waveguide in a substrate by means of a femtosecond laser system, the waveguide having a birefringence axis at a predetermined angle for at least a segment, such method including:
  preparing a substrate in which the waveguide has to be realized, such substrate including a free surface onto which the pulsed laser beam is configured to impinge;
  positioning an immersion lens (9) apt to focus the laser beam in the substrate (10);
  introducing a first optical element (11);
  making the laser beam impinge on the first optical element (11), which directs the laser beam towards the immersion lens (9);
  focusing the femtosecond pulsed laser beam (F) at a given depth inside the substrate (10), in order to induce a refractive index change in a volume of said substrate around the focus, wherein the laser beam (F) propagates in the substrate along a direction, said focusing including making the laser beam impinge on said immersion lens (9) in a first position;
  varying the propagation direction of the laser beam (F) in the substrate (10), maintaining the beam focused, translating or rotating the first optical element (11), in order to operate a translation of the laser beam, to modify the impinging position of the laser beam on the immersion lens (9), in order to reach a first propagation direction forming a first non-zero angle ($\theta_t$) with respect to the normal direction to the free surface of the substrate;
  translating the laser beam focus with respect to the substrate (10) in order to create a first waveguide segment (GD), defined by adjacent volumes in which the refractive index has been modified, wherein the birefringence axis of the formed first waveguide segment (GD) is at said fixed angle, which is a function of the first angle ($\theta_t$) describing the reached first propagation direction of the laser beam in the substrate.

A femtosecond laser system is a laser system able to produce a train of light pulses, each with a time duration of about 10-500 fs. The repetition rate of such pulse train typically ranges between 1 kHz and 100 MHz. Generally, such femtosecond laser system includes a femtosecond laser mode-locked oscillator, which emits a pulse train at high repetition rate (10-100 MHz). The oscillator may be followed by an amplification stage that increases the pulse energy, but emits a pulse train of lower repetition rate (1 kHz-20 Mhz). However, other schemes may be adopted for realizing a femtosecond laser. To the purposes of this invention, any laser system capable of producing a femtosecond pulse train may be employed.

The specific laser system employed and the pulse train average power may be the same already known and adopted in the field of femtosecond laser micromachining for realizing optical waveguides in a substrate. For instance, the method and the apparatus described in S. Eaton et al., *Optics Express* 16, 9443-9458 (2008) can be employed; there, pulses with 300 fs duration and 200-2000 kHz repetition rate are exploited to realize optical waveguides in borosilicate glass.

The substrate into which the waveguides are fabricated is preferably a dielectric substrate, and, more preferably, a dielectric substrate substantially transparent at the wavelength (or at the range of wavelengths) of the impinging laser beam, generated by the femtosecond laser system. Such substrates include pure silica or multi-component glasses (borosilicate, aluminosilicate, etc.), polymers or crystals (e.g. lithium niobate).

The pulse train generated by the laser system discussed above is focused into the substrate, typically at a predetermined distance. Preferably, the distance between the free surface of the substrate (defining the (X,Y) plane) and the center of the focal region ranges between 10 µm and 1000 µm. Such distance may be variable, i.e. the beam is focused at a certain distance, namely the waveguide is produced at a certain depth, for a first segment of the waveguide, while this distance is increased or decreased for a second segment of the waveguide. Thus, the waveguide is realized in a three-dimensional fashion inside the substrate being the focusing distance varied relatively to the plane defined by the free surface of the substrate itself. The three-dimensional realization of the waveguide is based, besides on the possible variation of the focus depth, on the way by which the relative translation between the substrate and the laser system is operated, as detailed in the following.

Within the laser focal region, and more precisely within a volume about the focal region, a refractive index modification of the substrates occurs because of the interaction between the laser beam and the material constituting the substrate. As a consequence of this interaction, a first volume which forms the core of the waveguide is generated.

In such first focusing process, the propagation direction of the laser beam inside the substrate may be arbitrarily tilted, namely it may describe a certain angle with respect to the normal to the free surface of the substrate. A previous waveguide segment might have been written already, by means of such a tilted beam, where such tilt angle had been chosen to achieve the desired direction of the birefringence axis for such waveguide segment. Otherwise, the initial propagation direction of the writing beam inside the substrate may be substantially normal to the free surface of the substrate itself, as in FIG. 1.

In order to realize a waveguide, having a birefringence axis describing a predetermined non-zero angle with respect to the normal to the free surface of the substrate, the propagation direction of the laser beam inside the substrate must be chosen to form a non-zero angle with respect to the normal to the free surface of the substrate itself. Namely, the birefringence axis describes an angle, with respect to the normal to the free surface, that is a function of the angle described by the propagation direction of the beam inside the substrate with respect to the same normal direction. More precisely, the two angles (the first, between the birefringence axis and the normal direction; the second, between the propagation direction of the laser beam and the same normal direction) are, preferably, substantially the same (angle between birefringence axis and normal direction=angle between propagation direction and normal direction), or mutually orthogonal.

The focal region is then translated with respect to the substrate, in order to realize a waveguide segment having the birefringence axis tilted at the desired angle. Such translation is preferably operated in a substantially transverse direction with respect to the propagation direction of the writing beam inside the substrate. In a first preferred embodiment, the substrate is translated with respect to the laser beam; otherwise, the laser beam may be moved with respect to the substrate. Defining the plane (X,Y) as the plane where the free surface of the substrate lies, the translation direction is preferably parallel to such plane for at least a segment. Anyway, it is also possible to apply an orthogonal translation with respect to the (X,Y) plane, namely along a Z axis, so that the fabricated waveguide gets closer or farther with respect to the surface of the substrate. This getting nearer or farer to or from the free surface of the substrate is achievable also getting the focus nearer or farther to or from the free surface of the substrate.

The immersion lens has the purpose of focusing the femtosecond laser beam in the substrate.

Preferably, the numerical aperture of the immersion lens is ranging between 0.2 and 1.4. The numerical aperture effectively employed must enable to reach an irradiation intensity, in the focal region, high enough to trigger the non-linear processes responsible for the waveguide formation.

In order to achieve a tilted propagation direction of the laser beam with respect to the normal to the free surface of the substrate, several methods can be adopted. In case the beam impinges normally onto the focusing elements apt to focus the beam, typically the propagation direction of the beam is not changed by the focusing elements. In order to tilt the propagation direction inside the substrate by an angle $\theta_t$, the propagation direction of the beam outside the substrate may be tilted by an angle $\theta_i$, by rotating the writing laser beam around an axis lying on the plane (X,Y) defined by the free surface of the substrate, for instance around the axis given by the translation direction of the substrate. Namely, in this case the writing laser beam is kept orthogonal to the translation direction, but impinges tilted at a certain angle, with respect to the normal to the free surface of the substrate.

The focused beam propagates into the substrate at an angle given by Snell's law:

$$n_0 \sin \theta_i = n_1 \sin \theta_t \qquad (1)$$

where $n_0$ is the refractive index of air, $n_1$ the refractive index of the substrate, $\theta_i$ the incidence angle and $\theta_t$ the angle given by the propagation direction inside the substrate. As a result of such writing process, namely obtained by translating the focal volume along an axis while the writing beam is kept at fixed incidence angle as described, the fabricated waveguide has substantially the same shape as in the case of orthogonal incidence of the laser beam onto the free surface of the substrate; however, its cross-section, in a plane orthogonal to the translation direction, is tilted by an angle $\theta_t$.

The Applicant has noted that a rotation of the propagation direction of the laser beam externally to the substrate presents several problems. The laser beam gets indeed deflected by refraction at the air-substrate interface, according to the Snell's laws; in addition, the higher the incidence angle is, the higher fraction of incident light is reflected by the free surface of the substrate; aberrations depend as well on the angle of incidence. Thus, on the one hand, the precise positioning of the waveguide inside the substrate is made more difficult; on the other hand, a re-optimization of the irradiation parameters for each possible angle of incidence would be required, because the irradiation conditions would be affected by angle-dependent reflections and aberrations.

Therefore, in a preferred embodiment, it is further object of to provide a method for writing a waveguide having the same properties as in the above described configuration, fabricated by a tilted beam, with particular regard to obtaining a waveguide segment with a birefringence axis tilted by a predetermined angle $\theta_t$, but overcoming indeed the drawbacks of the above described configuration.

Namely, in such a preferred embodiment, disclosed embodiments include translating said laser beam.

More preferably, this translation takes place in a plane containing the propagation direction of the beam externally to the substrate, in order to impinge on the oil immersion lens in a predetermined point.

In this way, the angle formed by the laser beam propagation direction, outside the substrate and before the focusing elements, and the free surface of the substrate is not varied at all; preferably, such angle formed by the propagation direction with respect to the plane (X,Y), outside the substrate and before the focusing elements, is kept constant to essentially 90°, maintaining a normal incidence condition on the focusing elements.

Thus, in a preferred embodiment, the angle described by the normal to the free surface of the substrate and the propagation direction of the laser beam is essentially equal to 0°.

By judiciously choosing the incidence point of the laser beam on the focusing elements (laser beam that, preferably, propagates outside the substrate along an essentially orthogonal direction with respect to the free surface of the substrate itself), one is able to control the angle formed by the propagation direction of the beam inside the substrate, with respect to the normal to the free surface of the substrate itself.

Preferably, the focusing means to focus the laser beam includes an immersion lens. The immersion liquid, typically index-matching oil put between the objective and the substrate surface, effectively quenches the reflections at the substrate interface. Thus, the focusing elements preferably include such immersion lens.

The fact that the laser beam is translated so that it impinges onto the immersion lens in different positions allows one to easily modify the angle formed between the propagation direction of the laser beam and the direction orthogonal to the substrate.

Preferably, the phase of impinging said laser beam onto said immersion lens includes the step of impinging said laser beam onto said immersion lens in a direction substantially parallel to an objective axis defined by said immersion lens.

As mentioned already, the propagation direction of the laser beam within the substrate depends on the impinging position of the laser beam onto the immersion lens. If the laser beam impinges the immersion lens exactly onto the objective center defined by the lens, there is no beam deflection. In other words the propagation direction of the laser beam does not change. It remains parallel to itself also after passing through the immersion lens. On the contrary, if it impinges onto a position outside the center, there is a deviation that depends on the impinging position. The larger the distance between the impinging point and the objective center, the bigger the angle formed between the propagation direction and the direction orthogonal to the substrate.

Translating the laser beam parallel to itself, by means of the positioned first optical element, allows to modify in a continuous manner the angle formed by the propagation direction of the laser beam within the substrate and at the same time to keep the focus position fixed.

The largest angle reachable of the propagation direction of the laser beam within the substrate depends on the numerical aperture of the immersion lens.

As a matter of fact, to a rotation or translation of the first optical element does not necessarily correspond to a "pure" translation of the laser beam, a deflection might be introduced as well, in other words an angular deviation, so that the laser beam does not remain exactly parallel to itself.

However it is possible to introduce solutions, such as a first optical element having a very long focal distance and at the same time limiting its numerical aperture, so that this angular deviation is kept very small which in turns produces a very small shift of the focus. This shift is reproducible and can be quantified, thus it is possible to correct it during the waveguide writing process, for example by means of a suitable software.

Preferably the process, by which the propagation direction of the laser beam in the substrate is varied, includes keeping the distance between the focal region and the surface substantially constant.

Thus, the distance between the focal region and the free surface of the substrate is preferably kept constant for at least a segment of the waveguide. In this way, several waveguide segments with different tilt angle of the birefringence axis may be fabricated in cascade, keeping the same distance from the free surface of the substrate.

In a preferred embodiment, the process by which the focal region is translated includes keeping substantially constant, for at least a segment, the distance of such focal region from the surface. Thus, the distance between the focus and the surface of the substrate, and consequently the distance of the waveguide from the surface, remains constant during the translation process. In this way the waveguide is substantially straight for at least one segment.

In one embodiment, the disclosed method includes:
varying the first propagation direction of the laser beam in the substrate, while keeping the beam focused, translating or rotating said first optical element, in order to operate a translation of the laser beam, to modify the impinging position of the laser beam on the immersion lens, in order to reach a second propagation direction which describes a second non-zero angle with respect to the first direction;
translating the focal region relatively to the substrate, in order to realize a second waveguide segment, defined by the adjacent volumes of modified refractive index; such waveguide segment yielding a birefringence axis which describes a second predetermined angle with the normal direction, which is a function of the second propagation direction.

In this way, in accordance with a second preferred aspect, the waveguide is composed of at least two segments having different birefringence axes; namely, a first axis in the first segment, tilted at a first predetermined angle with respect to the free surface of the substrate, and a second axis in a second segment, tilted at a second predetermined angle. The first and the second angle are different, i.e. the first and the second birefringence axes describe a non-zero angle between each other.

The waveguide may include further segments, each of them with a birefringence axis oriented along a different angle. Alternatively, the waveguide can be periodic, or divided into "periods" replicated identically for the whole waveguide length, each period being composed of a first segment with birefringence axis along a first angle and a second segment with birefringence axis along a second angle. A "period" may also be composed by an arbitrary number of segments with different tilt angles of the birefringence axes (the example described above was limited to two segments, but the period can include a first, a second and a third segment with a first, second and third tilt angle and so on).

In some embodiments, the disclosed method includes:
keeping the translation direction of the focal region substantially constant, before, after, and during the mentioned variation of the propagation direction.

Namely, the waveguide may be formed along a single axial direction.

Preferably, prior to the focusing stage of the femtosecond laser beam, the disclosed method may include:
reducing the diameter of such laser beam, in order to make it smaller than a clear aperture of the immersion lens.

In accordance with a preferred embodiment, the beam incident on the immersion lens has a reduced diameter, preferably smaller than the objective aperture. For instance, such immersion lens may include one microscope objective with high numerical aperture (preferably >1.0). In case the beam impinges on the centre of the objective clear aperture, the laser beam propagates beyond without varying its direction. Here, the effective numerical aperture of the focused beam is lower than the nominal (maximum) value of the objective; however, it is sufficient to reach in the focus enough intensity to trigger the non-linear processes responsible for the waveguide formation, because of the high value of the nominal numerical aperture of the objective. In case the beam impinges on the objective clear aperture in an off-centre position, namely in case the beam is translated to make it not impinge on the centre of the objective, the focus position is not altered (that is, the beam is focused at the same distance from the free surface of the substrate and within the same volume of the substrate) but the beam propagates inside the substrate along a direction tilted by an angle $\theta_r$, which depends on the distance of the incidence point on the objective clear aperture from the centre of the aperture itself. Hence, in the latter condition a waveguide with controlled tilt of the birefringence axis is obtained, as in the embodiment previously discussed.

The focusing elements preferably include a high-numerical-aperture objective.

The above described preferred embodiment of the disclosed method enable the following advantages, compared to the fabrication of a waveguide with tilted birefringence axis by rotating the laser beam propagation direction outside the substrate with respect to the substrate plane (X,Y):
the immersion lens is preferably designed to minimize aberrations, and realized in such way that all the optical rays, whatever be their direction after the focusing elements, converge towards the same focus (or focal region);
such fact, that the focus position remains unaltered while varying the incidence point of the beam onto the objective clear aperture, while the tilt angle of the beam after the immersion lens is varying, simplifies precise positioning of the fabricated waveguide within the substrate, and smoothly joining waveguide segments with different tilts.

In accordance with this preferred embodiment, in which the laser beam is translated externally to the substrate, and more preferably this translation occurs maintaining the beam orthogonal to the plane defined by the free surface of the substrate, the disclosed method may include, in the phase of varying the propagation direction of the beam:
making the laser beam impinge onto the immersion lens in a second position, such second position being at a predetermined distance from the first impinging position.

The aforementioned first optical element indeed substantially "shifts" the laser beam from one position to another on the immersion lens, namely operates a translation of the laser beam outside the substrate across different positions on the immersion lens.

As discussed above, a precise correspondence holds between the incidence position of the laser beam onto the immersion lens (preferably, the incidence position of the symmetry axis of the laser beam, which is propagating outside the substrate) and the angle formed by the laser beam propagation direction inside the substrate and the normal to the free surface of the substrate itself.

The additional first optical element easily operates such translation.

In accordance with disclosed embodiments, the translation of the beam or the translation or rotation of the optical element includes:
preparing a spherical lens, with long focal distance, in the optical path of the laser beam;
translating the spherical lens in order to translate the incidence point of the beam onto the immersion lens.

Preferably, a spherical lens operates the beam translation: a translation of the lens induces a translation of the beam.

Preferably, such lens both operates such translation of the beam onto the clear aperture of the immersion lens, and reduces the diameter of the beam at the same time. Preferably, such lens has a focal length of some tens of centimeters. The main effect of a transverse translation of the lens is a translation of the beam onto the clear aperture of the focusing elements. The deflection of the beam caused by such lens (which actually is the direct cause of the translation of the incidence point of the beam on the objective), due to the long focal distance of the lens itself, is small and does not relevantly affect the beam propagation after the focusing elements. As a matter of fact, the lens does not perform a "pure" translation of the beam, but a movement that is analogous to a translation for the purposes of this invention; hence, it will be referred to as such in the following.

Other optical elements, such as systems of mirrors or prisms, may be used in order to perform in other ways the translation of the laser beam and, possibly, also reduce its diameter. In general, the beam translation will be induced by rotation or translation movements of optical elements. Namely, a shift in the incidence position of the laser beam onto the immersion lens can be induced, rather than by a translation of the optical element, by a rotation of the optical element itself, or by a combination of translations and rotations, which effectively introduce an analogous translation of the laser beam outside the substrate.

It is worth highlighting the extreme simplicity of the method here described: with comparison to a conventional apparatus for femtosecond laser microfabrication, a single long-focal spherical lens has been added to the setup. On the contrary, altering the direction of the birefringence axis of lithographic waveguides requires a notable increase in the process complexity, for instance it requires adding lithographic steps, with all the related problems in aligning the masks for the different steps.

In some embodiments, the angle formed by the normal to the surface of the substrate and the propagation direction of the beam achieved in the substrate, ranges between 0° and 45°.

The tilt angle of the birefringence axis is preferably included in the range indicated above.

In a preferred embodiment, a propagation direction of the laser beam outside the substrate is substantially transverse to the translation direction of the focal region with respect to the substrate.

While propagating outside the substrate, the laser beam has a propagation direction substantially orthogonal to the translation direction of the focal region (which may correspond to a translation of the substrate or to a translation of the laser system).

Preferably, a propagation direction of the laser beam outside the substrate is also substantially transverse to the direction of the aforementioned translation of the laser beam.

In an embodiment, the cross-section of the modified volume around the focal region, has substantially elliptical shape.

A disclosed method may include:
  preparing the laser beam in order to be substantially symmetric with respect to an axis parallel to the propagation direction of the beam itself outside the substrate.

In addition to the focusing elements and to the first optical element, further optical elements may be introduced to perform the disclosed method, for instance in order to steer the laser beam from the laser systems that generates it to the substrate where the waveguide is to be formed.

In the applications, it is often needed to include, within the same device, cascaded waveguide segments with different tilt angle of the birefringence axis. By performing the disclosed method, these segments may be fabricated by subsequent scans of laser writing, one scan for each tilt angle; a fast optical shutter (e.g. an acousto-optic shutter) may be employed to enable the writing process only in the desired segments, with micrometer precision.

BRIEF DESCRIPTION OF THE DRAWINGS

The advantages of this invention will be better enlightened by a detailed description of some examples of embodiments, with reference to the drawings attached, in which:

FIG. 3 reports a schematic of a first example of the method for realizing an optical waveguide according to disclosed embodiments;

FIGS. 4a and 4b report schematics of a second example of the method for realizing an optical waveguide according to disclosed embodiments;

FIG. 5 shows a schematic of an alternative embodiment of the example of the method in FIGS. 4a and 4b;

FIG. 6 reports a schematic of a part of the apparatus needed for performing the method of the previous Figures.

DETAILED DESCRIPTION OF THE PREFERRED EMBODIMENTS

Figure 1:
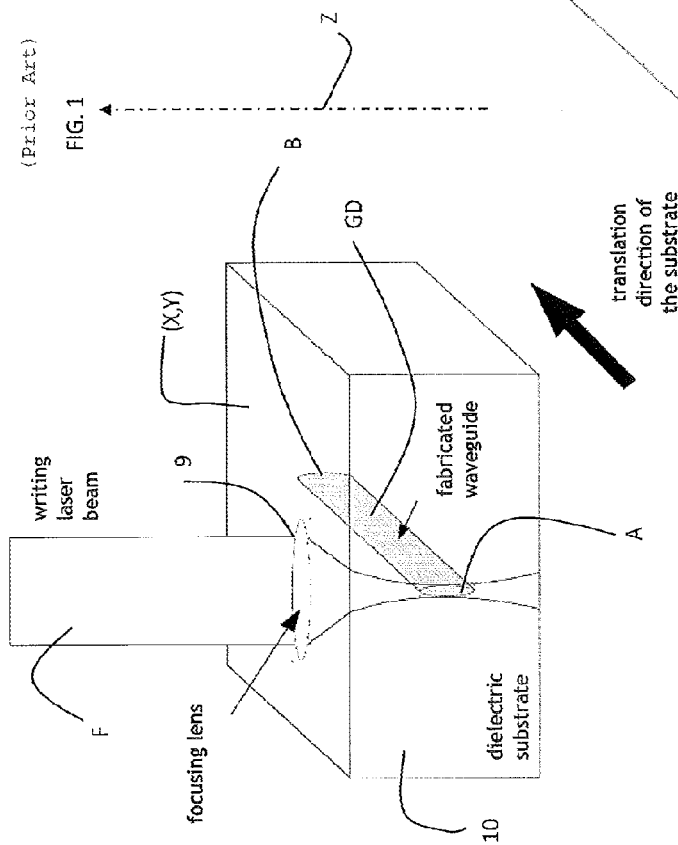
FIG. 1 reports a schematic of the process for realizing an optical waveguide by means of a femtosecond laser, according to the state-of-art technique.

With initial reference to FIG. 6, a set-up for implementing the method in accordance with the disclosed embodiments is schematically shown, and overall indicated by the numeric reference 1.

The experimental set-up 1, for femtosecond laser writing of waveguides into a substrate 10, includes a femtosecond laser system 2. Different femtosecond lasers may be used for this application: depending on the substrate and on the desired characteristics for the waveguide, pulse energy may range from tens of nJ to a few μJ, while the repetition rate of the pulse train may vary from 1 kHz to tens of MHz.

Further, the set-up 1 preferably includes an attenuation stage 3, typically consisting in a half-waveplate 3a followed by a polarizer 3b, used to finely control the pulse energy employed for the writing process. A shutter 4 is also preferably included, to enable/block the laser beam, namely to allow or prevent the beam to reach the substrate 10. Profitably, the setup may include a system of mirrors 5, to steer the beam to the machining area, particularly to make the beam impinge onto the focusing elements 6, such as a lens 9 or an objective. Furthermore, a high-precision translation system 7 is present, preferably acting on the substrate 10, preferably moving on three axes (X,Y,Z), controlled by a computer (not shown). Moreover, an optical element 11 may be optionally included to operate a translation of the laser beam externally to the substrate. Preferably, such optical element 11 includes a spherical lens.

The focusing elements 6 preferably include an immersion lens, with numerical aperture between 0.2 and 1.4.

Let's consider two points A and B in the substrate 10, between which an integrated waveguide GD is to be realized, and, in accordance with disclosed embodiments, an arbitrary transformation of the polarization state of the light propagating in such waveguide is desired, from one point to the other of the defined segment.

Following the technique at the state of the art, illustrated in FIG. 1, the part of the optical circuit between the two points A and B is entirely fabricated with waveguides with a cross-section showing vertical symmetry, i.e. "not tilted". The presence of modal birefringence, for the reasons discussed previously, make this waveguide segment equivalent to a birefringent waveplate with either vertical or horizontal fast axis. An optical mode with vertical or horizontal polarization propagates in the waveguide realized according to state-of-art technique without changing its polarization state (the mode propagates in the waveguide along the direction of the waveguide itself, namely the direction of translation of the substrate during the fabrication process). On the contrary, a circular or arbitrarily elliptical polarization state will be transformed in the propagation, with dependence on the length of the waveguide segment and on the value of the modal birefringence.

Figure 2:
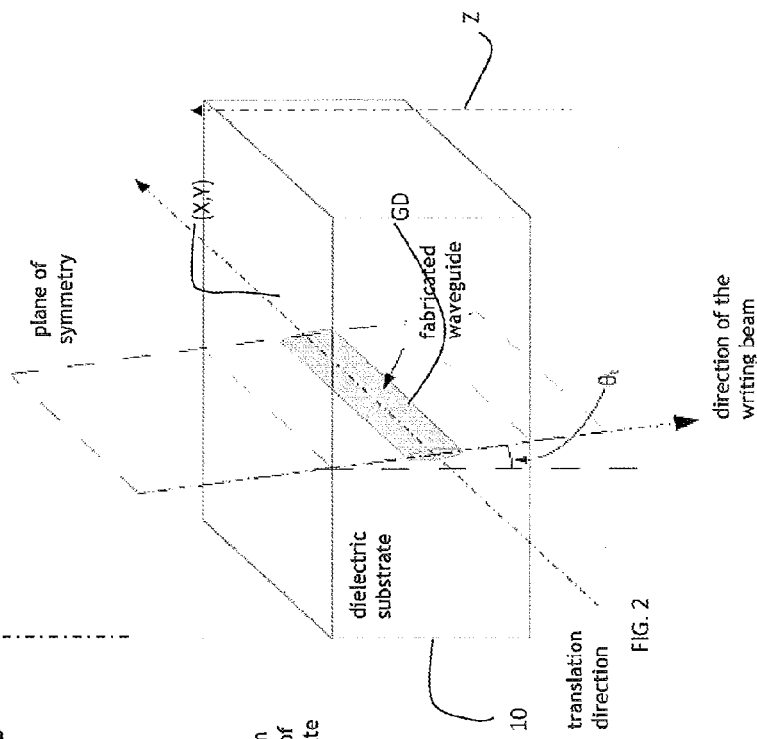
FIG. 2 reports a schematic of the process for realizing an optical waveguide by means of a femtosecond laser, according to disclosed embodiments.

In accordance with disclosed embodiments, one can realize a segment of optical circuit that produces an arbitrary manipulation of the polarization state of the propagating light. To this purpose, tilted waveguide segments (FIG. 2) need to be included. It is indeed possible to fabricate waveguide segments with different tilt angles of the birefringence axis: either by using the method shown in FIG. 3, namely by tilting the propagation direction of the laser beam F, emitted by the laser system 2, externally to the substrate 10, in order to produce a tilted propagation direction also inside the substrate; or by using the method shown in FIGS. 4a and 4b, in which the laser beam F emitted by the laser system 2, is translated onto the focusing elements 9 externally to the substrate 10. Detailing the latter option, in FIG. 4a the laser beam F propagates, outside the substrate, orthogonally to the plane defined by the free surface of the substrate, videlicet the propagation direction is substantially parallel to the Z axis and such a direction is maintained substantially unvaried also inside the substrate 10. In FIG. 4b the propagation direction of the beam F outside the substrate 10 is always substantially parallel to the Z axis, while inside the substrate it forms an angle $\theta_t$ with such Z axis.

Waveguide segments with different tilt angle may be combined in succession.

For example, a V polarized state (linear, vertical) is transformed into a + polarized state (linear, tilted by 45°) as follows.

Following the above described procedure (FIG. 3 or FIGS. 4a and 4b) a first waveguide segment is fabricated, by translating the substrate of a first desired length, with the laser beam F propagating orthogonally to the substrate surface both inside and outside the substrate (namely, the propagation direction of the laser beam follows the Z axis). As discussed herein, such a kind of waveguide segment does not alter the vertical polarization state of the propagating mode, hence its length may be arbitrary. Such first waveguide segment is followed by a second segment, with such a length to be equivalent to a half-waveplate, having a cross-section tilted by 22.5°, namely fabricated by a laser beam propagating in the substrate 10 with a direction tilted by 22.5° with respect to the normal to the plane (X,Y) defined by the free surface of the substrate 10. The 22.5° tilt angle of the propagation direction induces an equally tilted birefringence axis of the waveguide formed.

As a further example, let's consider the transformation of a vertical polarization state into a circular polarization state. To this purpose a first waveguide segment is inscribed, of arbitrary length, by a laser beam propagating along the vertical Z axis, both outside and inside the substrate, such segment not altering the guided vertically polarized mode. Such first segment is followed by a second waveguide segment, with cross-section tilted by 22.5° and such a length to be equivalent to a half-waveplate is combined in succession. A third waveguide segment is further added, having vertically oriented cross-section and a length equivalent to a quarter-waveplate. Both the first and the third segment have vertical birefringence axis. The length of the first segment is indeed irrelevant with regard to the proposed transformation, because it does not modify the vertical polarization state of the input beam. The third segment acts on a beam that is no longer vertically polarized (being already transformed by the second segment), hence the length of such segment becomes relevant.

Figure 7:
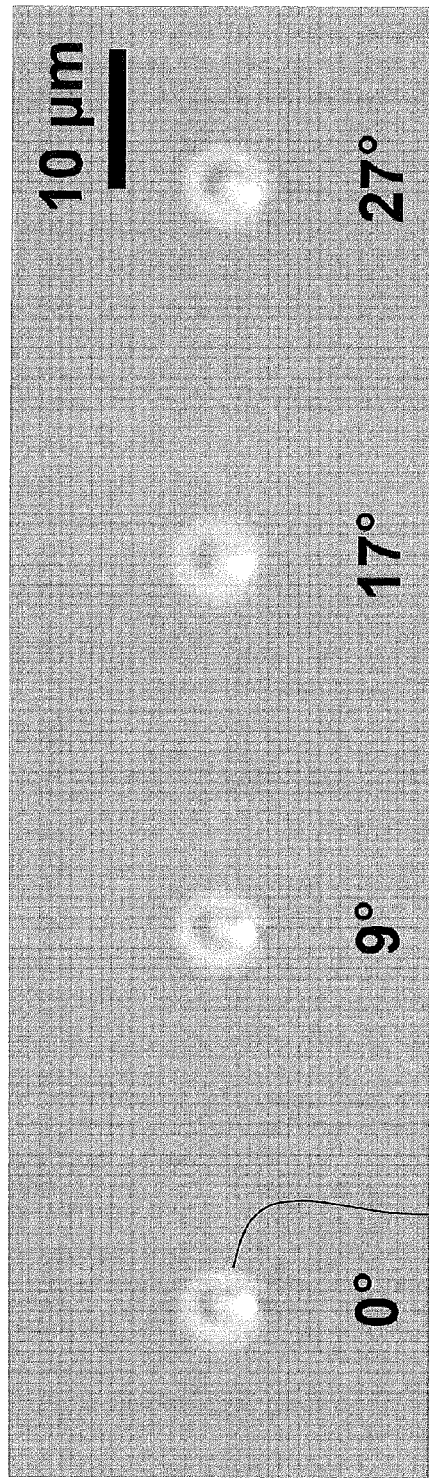
FIG. 7 is a photograph, taken by an optical microscope, of the cross-sections of waveguides fabricated according to the method of disclosed embodiments.

To fabricate the waveguides, whose cross-sections are reported in FIG. 7, laser pulses with 400 fs duration, 960 kHz repetition rate, 200 nJ energy and 1040 nm wavelength were employed. The preferred method described previously and exemplified in FIG. 5 was used, namely the laser beam F propagates outside the substrate 10 along the Z axis, i.e. with substantially perpendicular direction with respect to the plane defined by the free surface 10a of the substrate 10. The laser beam F can be translated by means of the spheric lens 11. By translating such a lens in the direction indicated by the arrow, the beam is translated and impinges onto the focusing elements 9 in different positions. Substantially, a translation of the lens 11 along an axis parallel to the plane (X,Y) corresponds to a translation of the impinging position of the beam F on the focusing elements (immersion lens) along the same axis. If the beam F impinges onto the centre of the immersion lens 9, i.e. the symmetry axis of the beam F crosses the centre of the lens 9, then beam propagates in the substrate always substantially along the Z axis. Otherwise, the beam propagates inside the substrate with a desired tilt angle. The focusing elements 9 include a 100× oil-immersion microscope objective, with numerical aperture N.A.=1.4. The translation of the beam is operated by a spheric lens 11 having a focal distance of 50 cm, placed at 44 cm distance from the focusing objective 9. The tilt angle of the fabricate waveguide, measured with an optical microscope, ranges between 0° and 30°. The maximum transverse translation of the spheric lens, required for covering this tilt range, is about 1.5 mm.

As shown in FIG. 7, the cross-section of the waveguide core may be different depending on the tilt angle of the propagation direction of the beam inside the substrate. FIG. 7 reports the cross-sections of several waveguides, in a plane normal to the translation direction of the substrate and containing the propagation direction of the beam.

Figure 8:
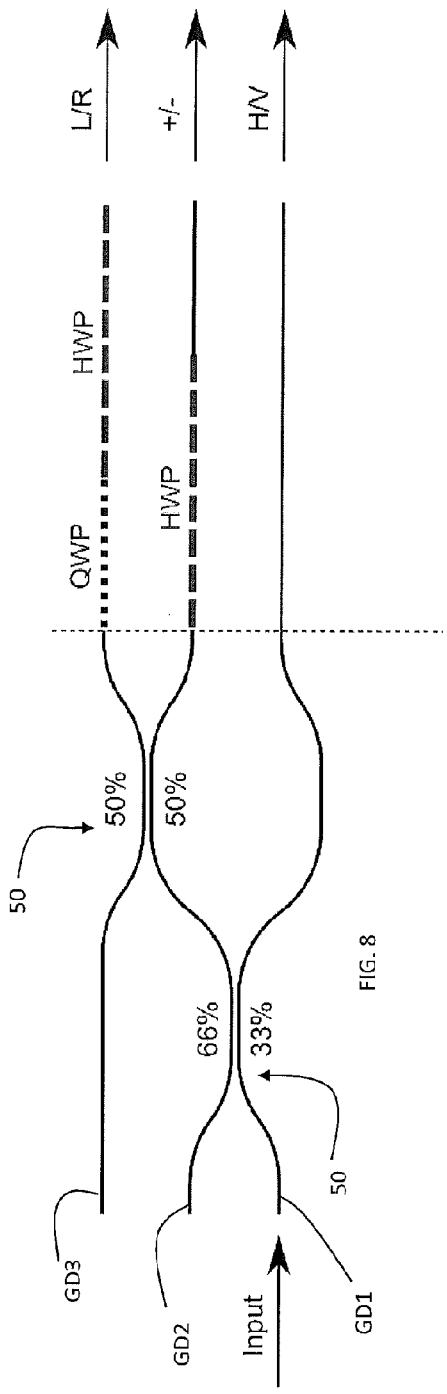
FIG. 8 reports a schematic of a device for polarimetry that exploits integrated birefringent waveplates, realized according to disclosed embodiments. The input light beam is equally split into three arms, by means of two cascaded directional couplers.

An integrated polarimetric system 100, schematically shown in FIG. 8, can be realized through the method described above, by exploiting waveguide segments working as integrated birefringent waveplates, inscribed by means of a laser beam with tilted propagation direction. A light signal is provided to the system 100 from the INPUT port. The system 100 includes a network of directional couplers 50, which splits the light from INPUT into three different waveguides, named GD1, GD2 and GD3. While the waveguide GD1 does not alter the propagating modes, the second one GD2 includes a segment equivalent to a half-waveplate HWP tilted by 22.5°, and the third one GD2 include a first segment equivalent to a vertically oriented quarter-waveplate QWP followed by a segment equivalent to a half-waveplate HWP tilted by 22.5°. An input beam H(V) polarized propagates unaltered in the first arm GD1, while an input beam with +(−) or L(R) polarization state is converted into a H(V) polarized in the second GD2 or third GD3 arm, respectively. If a polarizing beam splitter is placed at the output of this system 100, the resulting overall device allows to simultaneously project any input polarization state on the bases H/V, +/−, L/R. This allows to perform real-time measurements of the Stokes parameters of the input beam, or in other words to perform a tomographic characterization of its polarization state. The waveguide segments realized by the disclosed method may be used, among the other applications, as integrated half-waveplates (HWP) and quarter-waveplates (QWP); thus enabling, by means of a polarizing beamsplitter, the projection of the input polarization state on the bases H/V, +/−, L/R.

The invention claimed is:

1. A method of fabricating a waveguide in a substrate using a femtosecond laser system, such waveguide having a birefringence axis tilted at a fixed angle for at least a segment, comprising:

preparing a substrate in which the waveguide is to be fabricated, the substrate having a free surface upon which a femtosecond pulsed laser beam is configured to impinge;

positioning an immersion lens apt to focus the laser beam in the substrate;

introducing a first optical element;

making the laser beam impinge on the first optical element, which directs the laser beam towards the immersion lens;

focusing the femtosecond pulsed laser beam at a given depth inside the substrate, in order to induce a refractive index change in a volume of said substrate around the focus, wherein the laser beam propagates in the substrate along a direction, said focusing including making the laser beam impinge on said-immersion lens in a first position;

varying the propagation direction of the laser beam in the substrate, maintaining the beam focused, translating or rotating the first optical element, in order to operate a translation of the laser beam, to modify the impinging position of the laser beam on the immersion lens, in order to reach a first propagation direction forming a first non-zero angle with respect to the normal direction to the free surface of the substrate;

translating the laser beam focus with respect to the substrate in order to create a first waveguide segment, defined by adjacent volumes in which the refractive index has been modified, wherein the birefringence axis of the formed first waveguide segment is at said fixed angle, which is a function of the first non-zero angle describing the reached first propagation direction of the laser beam in the substrate.

2. The method of claim 1, including impinging said laser beam onto said immersion lens in a direction substantially parallel to an objective axis defined by said immersion lens.

3. The method of claim 1, wherein varying the propagation direction of the laser beam in said substrate includes keeping said depth of said focus in the substrate substantially constant.

4. The method of claim 1, wherein translating the laser beam focus includes keeping said depth of said focus in the substrate substantially constant.

5. The method of claim 1, comprising:
varying the first propagation direction of the laser beam inside the substrate, keeping the beam focused, translating or rotating the first optical element, in order to operate a translation of the laser beam, to modify the impinging position of the laser beam on the immersion lens, in order to reach a second propagation direction having a second non-zero angle with respect to the first propagation direction;
translating the laser beam focus with respect to the substrate in order to create a second waveguide segment, defined by adjacent volumes in which the refractive index has been modified, wherein said second waveguide segment has a birefringence axis at a second fixed angle, which is a function of the second propagation direction.

6. The method of claim 4, comprising:
keeping the translation direction of the focus with respect to the substrate substantially constant before, after and throughout the action of varying the first propagation direction.

7. The method of claim 1, wherein translating said laser beam comprises:
translating the laser beam on a plane containing said propagating direction outside said substrate in order to impinge on the immersion lens at a fixed position.

8. The method of claim 1 further comprises, before focusing the laser beam:
reducing the laser beam spot size, in order to make the laser beam spot size smaller than an aperture of said immersion lens.

9. The method of claim 1, wherein varying the first propagation direction comprises:
making the laser beam impinge on the focusing immersion lens at a second position, wherein this second position is at a determined distance with respect to the first position.

10. The method of claim 1, wherein translating said laser beam or translating or rotating the optical element comprises:
introducing a spherical lens with a long focal distance in the laser beam path;
translating the spherical lens, in order to translate the incidence position of the laser beam on the immersion lens.

11. The method of claim 1, wherein the first non-zero angle formed between the first propagation direction of the laser beam in the substrate and the direction orthogonal to the substrate surface ranges between 0° and 45°.

12. The method of claim 1, wherein a propagation direction of the laser beam outside the substrate is substantially orthogonal to the translation direction of the laser beam focus with respect to the substrate.

13. The method of claim 1, wherein a propagation direction of the laser beam outside the substrate is substantially orthogonal to the translation direction of the laser beam.

14. The method of claim 1, wherein the substrate includes a dielectric material.

15. The method of claim 1, wherein a cross section of the modified region in the laser beam focus has a substantially elliptical shape.

16. The method of claim 1, comprising:
preparing the laser beam in such a way that the laser beam is substantially symmetric with respect to an axis given by the propagation direction of the laser beam outside the substrate.

* * * * *